United States Patent [19]

Sextro et al.

[11] 4,070,415
[45] Jan. 24, 1978

[54] THERMOPLASTIC MOLDING COMPOSITIONS ON THE BASIS OF POLYOXYMETHYLENES

[75] Inventors: Gunter Sextro, Naurod, Taunus; Karlheinz Burg, Langenhain, Taunus; Rudolf Kern, Mainz; Heinz Schmidt; Ernst Wolters, both of Frankfurt am Main, all of Germany

[73] Assignee: Hoechst Aktiengesellschaft, Frankfurt am Main, Germany

[21] Appl. No.: 217,668

[22] Filed: Jan. 13, 1972

[30] Foreign Application Priority Data

Oct. 7, 1971 Germany ............................ 2150038

[51] Int. Cl.² ...................... C08L 59/02; C08L 63/00; C08L 63/02
[52] U.S. Cl. ................................ 260/830 R; 260/823
[58] Field of Search ........................... 260/823, 830 R

[56] References Cited

U.S. PATENT DOCUMENTS 3,519,696  7/1970  Cherdron et al. .................. 260/823
3,627,850  12/1971  Hafner et al. ..................... 260/823

Primary Examiner—Wilbert J. Briggs, Sr.
Attorney, Agent, or Firm—Curtis, Morris & Safford

[57] ABSTRACT

The invention provides thermoplastic molding compositions having improved properties. The compositions are composed of a mixture of from 99.999 to 99.9 wt.% of a linear polyoxymethylene and from 0.001 to 0.1 wt.% of a branched or cross-linked copolymer of trioxan with a multifunctionally reacting compound and optionally a monofunctionally reacting compound, or with a monofunctionally reacting compound and a branched or cross-linked polyether, or of a subsequently branched or cross-linked linear polyoxymethylene having functional groups in lateral or chain position.

2 Claims, No Drawings

THERMOPLASTIC MOLDING COMPOSITIONS ON THE BASIS OF POLYOXYMETHYLENES

The present invention relates to thermoplastic molding compositions on the basis of polyoxymethylenes (POM).

It is known that polyacetals (polyoxymethylenes POM) have a strong tendency to crystallize. Even if the melt is undercooled to a small extent only, a rapid growth of spherulites is observed which, in most cases, are much larger than the length of light waves and confer upon the material a considerble opacity. Moreover, owing to the crystallization process a great number of microscopically small fissures and internal tensions are formed in the interior and on the surface of the material. These fissures and internal tensions detrimentally affect the mechanical properties of shaped articles, for example injection molded articles, made from polyoxymethylenes. The aforesaid flaws are the more pronounced the larger the individual spherulites.

It is also known that by adding 0.0001 to 0.5% by weight of talc to polyoxymethylenes of high molecular weight and uniformly distributing the said inorganic additive in the organic polymer, the crystal structure of injection molded articles can be rendered more uniform and hence a structure of coarse spherulites having an average diameter of 100 microns can be transformed into a homogeneous structure in which the spherulites have a diameter of 4 to 8 microns (cf. British Pat. No. 1.133.490). The aforesaid data relate to injection molded articles which have been crystallized under pressure at a temperature in the range of from 50° to 100° C.

Furthermore, it is known that the size of the spherulites of polyoxymethylenes may be reduced by mixing the polyoxymethylenes, before melting them, with certain organic nucleating agents which, in the polyoxymethylene melt, are insoluble or soluble to a small extent only, for example hydroxy groups containing imidazole or pyrazine derivatives (cf. British Pat. No. 1 193.708).

It is also known that the crystalline structure of thermoplastic, crystallizable high polymers, for example oxymethylene polymers, can be modified during cooling of the polymer melt with the aid of nucleating agents which are chemically stable at a temperature above the crystallite melting point of the polymer (cf. U.S. Pat. No. 3,367,926). Besides a great number of the most different chemical compounds polyoxymethylene is also mentioned as nucleating agent but nothing is said about whether polyoxymethylenes are suitable nucleating agents for other polyoxymethylenes. Attempts to nucleate known linear homo- or copolymers of formaldehyde or trioxan by adding an identical or a different linear homo- or copolymer of formaldehyde or trioxan did not give, however, any nucleating effect.

The subject of the present invention is a group of thermoplastic molding compositions composed of a. a mixture of from 99.999 to 99.9 percent by weight of a linear polyoxymethylene and from 0.001 to 0.1 percent by weight of a branched or cross-linked copolymer of trioxan with a multifunctionally reacting compound which can be copolymerized with trioxan, and, optionally, with a monofunctionally reacting compound which can be copolymerized with trioxan, b. a mixture of from 99.999 to 90 percent by weight of a linear polyoxymethylene and from 0.001 to 10 percent by weight of a subsequently branched or cross-linked linear polyoxymethylene having functional groups in lateral or chain position, or c. a mixture of from 99.999 to 90 percent by weight of a linear polyoxymethylene and from 0.001 to 10 percent by weight of a branched or cross-linked copolymer of trioxan with a monofunctionally reacting compound which can be copolymerized with trioxan and with a branched or cross-linked polyether.

The linear polyoxymethylenes used in the molding compositions of the invention are prepared according to known processes and are homopolymers of formaldehyde or of trioxan or copolymers of trioxan and at least one compound of monofunctional reaction which can be copolymerized with trioxan.

Molding compositions of the invention according to (a) preferably contain from 99.99 to 99.9% by weight of the linear polyoxymethylene and from 0.01 to 0.1% by weight of the branched or cross-linked polyoxymethylene.

The amount of the linear polyoxymethylene in the molding compositions of the invention accordng to (b) is preferably from 99.99 to 95% by weight, while the amount of branched or cross-linked polyoxymethylene is preferably from 0.01 to 5% by weight. Molding compositions containing from 99.9 to 98% by weight of the linear polymer and from 0.1 to 2% by weight of the branched or cross-linked polymer according to (b) have especially good properties.

Molding compositions of the invention according to (c) preferably are composed of from 99.9 to 95% by weight of the linear polyoxymethylene and from 0.1 to 5% by weight of the branched or cross-linked polyoxymethylene. Molding compositions of the invention containing branched or cross-linked polyoxymethylenes according to (c) which are composed of from 99.5 to 97% by weight of the linear polyoxymethylene and from 0.5 to 3% by weight of the branched or cross-linked polyoxymethylene have especially good properties.

Branched or cross-linked polyoxymethylenes having a low melt index generally are used in smaller amounts in order to attain a satisfactory nucleation than polyoxymethylenes having a higher melt index.

By homopolymers of formaldehyde or trioxan there are to be understood those homopolymers of formaldehyde or trioxan the terminal hydroxyl groups of which have been stabilized against degradation by chemical reaction, for example esterification or etherification.

When linear trioxan copolymers are used, suitable comonomers for trioxan are cyclic ethers having from 3 to 5, preferably 3 ring members, or cyclic acetals differing from trioxan having from 5 to 11, preferably 5 to 8 ring members, or linear polyacetals, each in amounts of from 0.1 to 20, preferably 0.5 to 10% by weight. Most suitable are copolymers containing from 99 to 95% by weight of trioxan, and from 1 to 5% by weight of one of the above-mentioned components.

Suitable cyclic ethers or cyclic acetals are compounds of the formula (I)

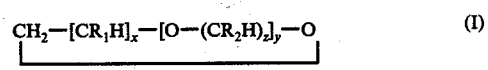

where $R_1$ and $R_2$ may be the same or different, each representing a hydrogen atom, an aliphatic alkyl radical having from 1 to 6, preferably from 1 to 3 carbon atoms, which radical may contain from 1 to 3 halogen atoms, preferably chlorine atoms, or a phenyl radical, $x$ is either an integer of from 1 to 3 and $y$ is zero, or $x$ is zero, $y$ an integer of from 1 to 3 and $z$ is 2, or $x$ is zero, $y$ is 1 and $z$ is an integer of from 3 to 6, preferably 3 or 4, or where $R_1$ is an alkoxymethyl radical having from 2 to 6, preferably from 2 to 4 carbon atoms, or a phenoxymethyl radical, $x$ being 1, $y$ being zero and $R_2$ being as defined above.

Especially suitable as cyclic ethers or cyclic acetals are compounds of the formula (II)

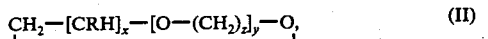

$$CH_2-[CRH]_x-[O-(CH_2)_z]_y-O \qquad (II)$$

where R is a hydrogen atom, an aliphatic alkyl radical having from 1 to 6, preferably from 1 to 3 carbon atoms, which radical may contain from 1 to 3 halogen atoms, preferably chlorine atoms, or a phenyl radical, $x$ is either a integer of from 1 to 3 and $y$ is zero, or $x$ is zero, $y$ an integer of from 1 to 3 and $z$ is 2, or $x$ is zero, $y$ is 1 and $z$ an integer of from 3 to 6, preferably 3 or 4, or where R is an alkoxymethyl radical having from 2 to 6, preferably from 2 to 4 carbon atoms, or a phenoxymethyl radical, $x$ being 1 and $y$ zero.

Preferably, there are used as cyclic ethers or cyclic acetals compounds of the formula (III)

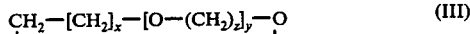

$$CH_2-[CH_2]_x-[O-(CH_2)_z]_y-O \qquad (III)$$

where $x$ either is an integer of from 1 to 3 and $y$ is zero, or where $x$ is zero, $y$ an integer of from 1 to 3 and $z$ is 2, or where $x$ is zero, $y$ is 1 and $z$ an integer of from 3 to 6, preferably 3 or 4.

Suitable cyclic ethers are above all those having 3 ring members, for example ethylene oxide, styrene oxide, propylene oxide, or epichlorohydrin or phenylglycidyl ether.

Suitable cyclic acetals are above all cyclic formals of aliphatic or cyclo-aliphatic α, ω-diols having from 2 to 8, preferably from 2 to 4 carbon atoms, the carbon chain of which may be interrupted by an oxygen atom at intervals of 2 carbon atoms, for example glycol formal (1,3-dioxolane), butanediol formal (1,3-dioxepane) or diglycol formal (1,3,6-trioxocane), furthermore 4-chloromethyl-1,3-dioxolane or hexanediol formal (1,3-dioxonane).

As linear polyacetals there may be used homo- or copolymers of the cyclic acetals as defined above, as well as linear condensates of aliphatic or cycloaliphatic α, ω-diols with aliphatic aldehydes or thioaldehydes, preferably formaldehyde. Especially suitable are homopolymers of linear formals of aliphatic α, ω-diols having from 2 to 8, preferably from 2 to 4 carbon atoms, for example polydioxolane, poly-(1,3-propanediol formal) or poly-(1,4-butanediol formal).

The reduced specific viscosity values (RSV values) of the linear polyoxymethylenes used in accordance with the invention (measured at 140° C in butyrolactone containing 2% by weight of diphenylamine, in a concentration of 0.5 g/100 ml) are from 0.07 to 2.50 dl.g$^{-1}$, preferably from 0.14 to 1.20 dl.g$^{-1}$. The crystallite melting points of the polyoxymethylenes are in the range of from 140° to 180° C, the densities thereof in the range of from 1.38 to 1.45 g.ml$^{-1}$ (measured according to DIN 53 479).

The linear, preferably binary or ternary trioxan copolymers used in accordance with the invention are prepared in known manner by polymerization of the monomers in the presence of catalysts having a cationic action at temperatures of from 0° to 100° C, preferably from 50° to 90° C (cf. British Pat. No. 903.668). As catalysts, there are used for example Lewis acids, such as boron trifluoride or antimony pentafluoride, or complex compounds of Lewis acids, preferably etherates, for example boron trifluoride-diethyl-etherate or boron trifluoride-ditert.-butyl-etherate. Furthermore, there are used protonic acids, for example perchloric acid, or salt-like compounds, for example triphenylmethyl-hexafluoro-phosphate, triethyl-oxonium-tetrafluoro-borate or acetyl-perchlorate. The polymerization may be carried out in the mass, in suspension or in solution. In order to remove unstable amounts, the copolymers are advantageously subjected to a controlled, partial, thermal or hydrolytic degradation down to primary terminal alcohol groups (cf. British Pat. Nos. 926.903, 951.272 and 986.925).

The homopolymers of formaldehyde or trioxan used in accordance with the invention are also prepared in known manner by catalytic polymerization of the monomer (cf. for example U.S. Pat. No. 2.768.994 and British Pat. No. 877.820).

When the branched or cross-linked polyoxymethylenes of (a) used in accordance with the invention are prepared by copolymerization of trioxan with at least one compound of multifunctional reaction which can be copolymerized with trioxan or, optionally, with at least one compound of monofunctional reaction with trioxan, the multifunctional compounds generally are used in amounts of from 0.01 to 5, preferably from 0.05 to 2% by weight, and the monofunctional compounds generally in amounts of from 0.1 to 10, preferably from 1 to 5% by weight.

As compounds of monofunctional reaction there are employed the cyclic ethers, cyclic acetals or linear polyacetals mentioned in connection with the preparation of the linear trioxan copolymers used in accordance with the invention.

As compounds of multifunctional reaction, those monomer or oligomer compounds are employed which contain at least one of the cited monofunctional cyclic ether or cyclic acetal groups, and none, one or several linear acetal groups; the total number of the cited reactive cyclic ether, cyclic acetal and linear acetal groups being at least 2. Preferably, alkylglycidyl formals, polyglycol-diglycidyl ethers, alkanediol-diglycidyl ethers or bis(alkanetriol)-triformals are used.

By alkylglycidyl formals there are to be understood compounds of the formula (IV)

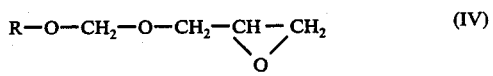

$$R-O-CH_2-O-CH_2-CH-CH_2 \qquad (IV)$$
$$\diagdown O \diagup$$

where R is an aliphatic alkyl radical having from 1 to 10, preferably from 1 to 5 carbon atoms. Very advantageous are alkylglycidyl formals of the above formula, where R is a linear lower aliphatic alkyl radical, for example methyl-, ethyl-, propyl- or butyl-glycidyl formal.

Polyglycol-diglycidyl ethers are compounds of the formula (V)

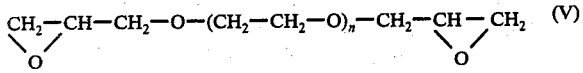

where n is an integer of from 2 to 5. Especially suitable are poly-diglycidyl ethers of the above formula, where n is 2 or 3, for example diethyleneglycol or triethyleneglycol-diglycidyl ether.

Alkanediol-diglycidyl ethers are compounds of the formula (VI)

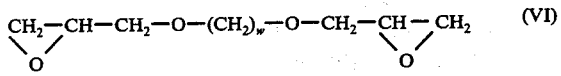

where w is an integer of from 2 to 6, preferably from 2 to 4. Butane diol-diglycidyl ether is especially suitable.

By bis(alkanetriol)-triformals, there are to be understood compounds having one linear and two cyclic formal groups, especially compounds of the formula (VII)

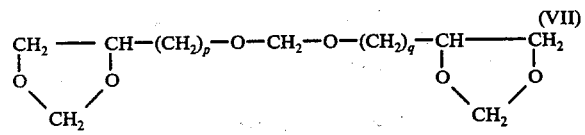

where p and q each are integers of from 3 to 9, preferably 3 or 4. Especially suitable are symmetric bis(alkanetriol)-triformals of the cited formula, where p and q represent the same number, for example bis(1,2,5-pentanetriol)-triformal or, preferably, bis(1,2,6-hexanetriol)-triformal.

As compounds of multifunctional reaction for the preparation of the branched or cross-linked polyoxymethylenes used in accordance with the invention, also those oligomer formals may be employed which are obtained by reaction of 1 mol of a 1,2(5-11)-triol with 0 to 1 mol of an α, ω-diol having a molecular weight of from 62 to 1000, 0 to 1 mol of a monohydric alcohol having from 1 to 11 carbon atoms and 1 mol of formaldehyde per 2 mols each of OH groups of the reaction mixture (cf. British Pat. No. 1.171.107).

The copolymerization of trioxan with the cited multifunctional and monofunctional compounds is carried out in the same manner as indicated for the preparation of the linear trioxan copolymers. The degradation of unstable terminal chain groups may be carried out in principle according to the methods known for the stabilization of terminal groups of trioxan copolymers. It is, however, also possible to employ the branched or cross-linked polyoxymethylenes directly as nucleating agent in a finely ground form, without further work-up.

A further method for the preparation of these branched or cross-linked polyoxymethylenes comprises reagent linear polyoxymethylenes with the above-mentioned multifunctional compounds in the presence of cationic catalysts, and, preferably, using inert diluents, for example cyclohexane, n-hexane or methylene chloride.

The branched or cross-linked polyoxymethylenes of (b) used in accordance with the invention are obtained by intermolecular reaction of linear polyoxymethylenes with functional groups in lateral or chain position, optionally after chemical conversion of these groups into other functional groups, and optionally in the presence of bifunctional cross-linking agents.

The above polyoxymethylenes having functional groups in lateral or chain position are prepared by polymerization of a mixture of from 99.9 to 60, preferably from 99.7 to 80% by weight of trioxan, from 0 to 20, preferably from 0.1 to 10% by weight of a cyclic ether having from 3 to 5 ring members, or a cyclic acetal differing from trioxan having from 5 to 11 ring members, or a linear polyacetal, and from 0.1 to 20, preferably from 0.2 to 10% by weight of at least one multifunctional compound which can be copolymerized with trioxan. Especially good results are obtained when from 1 to 5% by weight of monofunctional and from 1 to 5% by weight of multifunctional compounds are employed.

For the preparation of the linear, functional groups containing polyoxymethylenes, there are used as multifunctional compounds monomer compounds containing on the one hand a functional group which reacts under the polymerization conditions, and on the other hand at least one functional group which does not react under the polymerization conditions. Especially suitable are saturated cyclic ethers or acetals having aromatic or aliphatic substituents which, for their part, carry at least one such functional group which at first does not react, or at least mono-unsaturated cyclic ethers or acetals. Preferably, aldehyde, hydroxy, nitro or ester groups or epoxy compounds containing halogen atoms are employed, for example o-, m- or p-glycidoxy-benzaldehyde, 3-methyl-4-glycidoxy-benzaldehyde, 3-methoxy-4-glycidoxy-benzaldehyde, p-glycidoxy-nitrobenzene, 2,4-dinitro-1-glycidoxy-benzene, 1,6-dinitro-2-glycidoxy-naphthalene, p-glycidoxy-benzoic acid methyl ester, epoxy-methacrylic acid methyl ester, p-glycidoxy-cinnamic acid-methyl ester or epichlorohydrin. As unsaturated cyclic acetals, there are especially used mono-unsaturated cyclic formals having more than 6, preferably 7 or 8 ring members, for example 1,3-dioxa-cycloheptene(5), or cyclic formals having double bonds not being in ring position and having from 5 to 11, preferably from 5 to 8 ring members, for example 4-vinyldioxolane-1,3 or 5-vinyl-1,3-dioxa-cyclohexane.

As unsaturated cyclic ethers there are employed above all cyclic ethers having from 3 to 5 ring members and a double bond not being in ring position, for example butandiene-monoxide, dicyclo-pentadiene-monoxide or vinyl-cyclohexene-oxide (1-vinyl-3,4-epoxy-cyclohexane).

The monomers are polymerized in known manner in the presence of cationic catalysts at temperatures of from 0° to 100° C, preferably from 50° to 90° C (cf. for example British Pat. Nos. 1.146.649, 1.179.260, 1.179.576, 1.031.705 and 1.039.936). The degradation of unstable terminal chain groups may be carried out in principle according to the methods known for the stabilization of terminal groups of trioxan copolymers.

The conversion of the linear polyoxymethylenes having functional groups in lateral or chain position into branched or cross-linked polyoxymethylenes is carried out, optionally after chemical alteration of the functional groups, either by direct reaction of the functional groups with each other, or by reaction with bifunctional cross-linking agents. The conversion may be carried out in solution, in suspension or, preferably, in the melt. As solvents, there are used inert polar solvents, for example benzyl alcohol, chlorobenzene, dimethyl formamide or γ-butyrolactone. Suitable suspension agents are inert aliphatic, cycloaliphatic or aromatic hydrocarbons having from 6 to 18 carbon atoms, for example hexane, cyclohexane or toluene.

Cross-linking is carried out at temperatures of from 50° to 230° C. In solution, a temperature range of from 110° and 170° C is preferred, in suspension, the temperature should be from 50° C to 170° C, and in the melt from 150° to 230° C.

Reactions induced by irradiation are also quite suitable (cf. British Pat. Nos. 863.176 and 1.155.863).

Polyoxymethylenes containing aldehyde groups are advantageously linked by condensation with cross-linking agents of bifunctional action, especially with hydrazine, terephthalic acid dihydrazide, semi-carbazide, dicyano-diamide, urea, thiourea, thioacetamide, ammonia, acetone; aliphatic or aromatic diamines, for example hexamethylene diamine or phenylene diamine; or diisocyanates, for example 4,4+-diisocyanato-diphenylmethane (cf. British Pat. No. 1.156.045). Optionally, the presence of basic catalysts, for example piperidine, is advantageous.

Polyoxymethylenes having lateral nitro groups first are converted, according to known methods, into polyoxymethylenes having lateral amino groups. By linking these amino groups using suitable bifunctional agents, such as dialdehydes (for example terephthalic dialdehyde, glyoxal, glutaric dialdehyde), diisocyanates (for example hexane-1,6-diisocyanate, toluylenediisocyanate, naphthalene-diisocyanate-(1,5) or 4,4'-diisocyanato-diphenylmethane), or dicarboxylic acid anhydrides (for example maleic, succinic or phthalic anhydride), branched or cross-linked polyoxymethylenes are obtained.

Polyoxymethylenes having lateral ester groups, after conversion of the ester groups into free carboxyl groups (cf. British Pat. No. 1.191.505), are linked by using cross-linking agents of bifunctional action; they are reacted especially with diisocyanates (for example phenylene diamine, hexamethylene diamine), diols (for example butanediol-1,4)), hydrazine or dihydrazides. A direct reaction of the unsaponified ester groups with diols, for example butanediol-(1,4), preferably in the presence of basic transesterification catalysts, for example sodium hydroxide, is also possible.

Polyoxymethylenes having lateral hydroxyl groups, which for example are obtained by copolymerization of trioxan with epichlorohydrin and exchange of the chlorine atoms against hydroxyl groups by reaction of the polymers with alkali metal hydroxide solutions at elevated temperatures, are linked by using cross-linking agents of bifunctional activity, for example diisocyanates, dicarboxylic acid anhydrides, dicarboxylic acid esters or diketene.

Polyoxymethylenes having lateral halogen atoms, preferably chlorine atoms, are converted into branched or cross-linked polyoxymethylenes by direct reaction of the lateral halogen atoms with the alkali metal salts of organic compounds having at least two groups of weakly acidic reaction per molecule, preferably bisphenols, for example 4,4'-dihydroxy-diphenyl-dimethylmethane or 4,4'-dihydroxy-diphenylmethane.

Linear polyoxymethylenes having double bonds in chain or lateral position are converted into branched or cross-linked polyoxymethylenes for example by reaction, preferably in the melt, with sulfur and 2-mercaptobenzthiazole.

Furthermore, polyoxymethylenes having groups of different reactivity can be reacted with each other in order to obtain cross-linked products, for example by reaction of polyoxymethyl-enes containing aldehyde groups with those containing amino groups.

The branched or cross-linked polyoxymethylenes of (c) used in accordance with the invention are prepared by polymerization of trioxan with branched or cross-linked polyethers, optionally in the presence of at least one compound known for the copolymerization of trioxan. In this case, mixtures of from 99.99 to 50, preferably from 99.8 to 70% by weight of trioxan, from 0 to 20, preferably from 0.1 to 10% by weight of at least one compound known for the copolymerization with trioxan, and from 0.01 to 30, preferably from 0.1 to 20% by weight of a branched or cross-linked polyether are used for the polymerization. Best results are obtained when from 98.5 to 85% by weight of trioxan, from 1 to 5% by weight of at least one compound known for the copolymerization with trioxan, and from 0.5 to 10% by weight of a branched or cross-linked polyether are employed.

As branched or cross-linked polyethers there are used copolymers of at least one, preferably two, monofunctionally reacting cyclic ethers having from 3 to 5 ring members, and a bifunctionally reacting cyclic ether, i.e. an aliphatic or cycloaliphatic compound containing two ring ether groups and from 3 to 5, preferably 3 to 4, ring members.

As monofunctionally reacting cyclic ethers there are used preferably compounds of the formula (VIII)

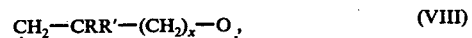
(VIII)

where R and R' are the same or different, each representing a hydrogen atom, an aliphatic alkyl radical having from 1 to 6, preferably from 1 to 3, carbon atoms, which radical may contain from 1 to 3 halogen atoms, preferably chlorine atoms, or a phenyl radical, and $x$ is zero or 1 to 2. Examples are ethylene oxide, propylene oxide, isobutylene oxide, epichlorohydrin, oxacyclobutane, 3,3-bis(chloromethyl)-oxacyclo-butane, or tetrahydrofuran.

Suitable bifunctionally reacting cyclic ethers are especially diglycidyl ethers of $\alpha,\omega$-diols having from 2 to 8, preferably from 2 to 4 carbon atoms, the carbon chain of which may be interrupted by an oxygen atom at intervals of 2 carbon atoms, or diglycidyl ethers of bisphenols, or aliphatic or cycloaliphatic hydrocarbons doubly substituted by an oxacyclobutyl radical and having from 1 to 6 carbon atoms. Examples are: 1,3-propanediol- or 1,4-butanediol-diglycidyl ether, glycol-, diglycol- or triglycol-diglycidyl ether, 4,4'-bisglycidoxyphenyl-dimethylmethane, 1,2-bis(3-oxacyclobutyl)-ethane, 1,4-bis(3-oxacyclobutyl)-butane or 2,9-dioxa-dispiro[3.2.3.2] duodecane.

The amount of monofunctionally reacting cyclic ethers generally is from 99.99 to 98, preferably from 99.95 to 99% by weight, while the amount of the bifunctionally reacting cyclic ether is from 0.01 to 2, preferably from 0.05 to 1% by weight.

The branched or cross-linked polyethers generally are prepared according to known methods by copolymerization of the monomers using cationic or anionic initiators. The polyethers may also be obtained by additional grafting or condensation of linear polyethers.

The copolymerization of trioxan with the branched or cross-linked polyethers as described and, optionally, with at least one compound known for the copolymerization of trioxan is carried out in the manner already indicated for the preparation of linear trioxan copolymers.

It is furthermore possible to incorporate branched or cross-linked polyethers into linear polyoxymethylenes by mixing polyethers and polyoxymethylenes, preferably in the presence of a solvent for polyethers, for example cyclohexane or methylene chloride, and by reacting them at temperatures of from 0° to 100° C, preferably from 50° to 90° C, using cationic catalysts. Unstable amounts are removed or terminal hydroxyl groups are stabilized in an analogous manner as described above.

The branched or cross-linked polyoxymethylenes used in accordance with the invention have melt indices $i_2$ of from 0 to 50 g/10 min., preferably from 0 to 10 g/10 min. according to DIN 53 753 at a temperature of 190° C and a load of 2.16 kg. By indicating an inferior limit value of zero for $i_2$ it is to be understood that above a determined cross-linking degree the polyoxymethylenes used in accordance with the invention cannot be molten or dissolved, that therefore their characterization via melt indices or RSV values is impossible. Especially suitable are branched or cross-linked polyoxymethylenes having melt indices $i_2$ of from 0.1 to 5 g/10 min.

Both the components of the molding compositions of the invention may be mixed with stabilizers against the action of heat, oxygen and light and subsequently be homogenized in the melt. Suitable heat stabilizers are, for example, polyamides, amides of polybasic carboxylic acids, amidines, hydrazines, ureas and poly(N-vinyl-lactams). As oxidation stabilizers phenols, especially bisphenols, and aromatic amines are used and suitable stabilizers against the action of light are derivatives of α-hydroxy-benzophenone and of benzotriazole, the stabilizers being used in an amount of from 0.1 to 10% by weight, preferably 0.5 to 5% by weight, calculated on the total mixture.

For the preparation of the molding compositions of the invention, the components are mixed in the form of powder or granules and subsequently homogenized in the melt. Branched or cross-linked polyoxymethylenes having melt index values below 0.1 g/10 min. are advantageously used in the form of dust-like powders (size of grain <1 micron).

Mixing and homogenizing of the components of the invention may be carried out in any heatable mixing equipment, for example rollers, calenders, kneaders or extruders. The mixing temperatures and advantageously above the crystallite melting point of the components, and they are in the range of from 150° to 250° C, preferably from 170° to 200° C.

Obviously, by the presence of branched or cross-linked polyoxymethylenes, the molding compositions of the invention are nucleated during the manufacture of shaped articles, which results in a reduced size of the spherulites and in improved properties of the shaped articles. They have, for example, increased ball indentation hardness, tensile stress at yield and at break, and stiffness in torsion as compared with an unmodified linear polyoxymethylene. A further result of the nucleation is an increased crystallization rate which makes possible an increased speed of processing, proved by shorter injection molding cycle times and narrower tolerances of injection molded articles.

A further advantage of using branched or cross-linked polyoxymethylenes as nucleating agent for linear polyoxymethylenes according to the present invention resides in the fact that the branched or cross-linked polyoxymethylenes can be synthesized as products of uniform quality which do not require special purification, as this is necessary for example when using natural minerals suitable as nucleating agents.

Quite generally, a nucleation of linear polyoxymethylenes by adding small amounts of branched or cross-linked polyoxymethylenes is possible. Thus, the examples for the preparation of branched or cross-linked polyoxymethylenes given herein are not exhaustive, and they only illustrated some possible methods without limiting the application of branched or cross-linked polyoxymethylenes in accordance with the invention.

The molding compositions of the invention can be comminuted mechanically, for example by chopping or grinding, into granules, chips, flakes or powders, and processed in the thermoplastic state, for example by injection molding or extrusion. They may be used for the manufacture of shaped articles which are employed as semi-finished or finished goods, for example bars, rods, plates, films sheets, ribbons, bowls or tubes; and they are especially suitable for the manufacture of machine parts requiring dimensional accuracy, for example gear wheels, bearing parts or elements for control units.

The following Examples illustrate the invention; parts and percentages being by weight unless otherwise stated.

EXAMPLES 1 to 6

A linear copolymer of 98% of trioxan and 2% of ethylene oxide having a density of 1.41 g.ml$^{-1}$, a RSV value of 0.73 dl.g$^{-1}$ and a crystallite melting point of 166° C is mixed, in the form of a powder, with 0.5% of bis(2-hydroxy-3-tert.-butyl-5-methylphenyl)methane and 0.1% of dicyano-diamide, relative to the amount of the linear polyoxymethylene, and with varying amounts, relative to the mixture in each case, of a cross-linked terpolymer of 98% of trioxan, 1.8% of ethylene oxide and 0.2% of 1.4-butanediol-diglycidyl ether having a melt index $i_2$ of 0.2 g/10 min., which previosuly has been stabilized in the same manner, and which is in the form of granules; and the mixture is homogenized at 200° C in a single screw extruder. The residence time in the cylinder of the extruder is about 4 minutes. After leaving the extruder, the polyoxymethylene mixture obtained in each case is granulated.

To determine the size of the spherulites in the products obtained films having a thickness of about 10 microns are prepared from the granules or shaped articles by melting them at 180° C between two glass plates with subsequent crystallization at 150° C under atmospheric pressure, which films are examined under the microscope.

Furthermore, sheets of dimensions 60 × 60 × 2 millimeters are made from the granules by injection molding at a temperature of the composition of 200° C and a temperature of the mold of 80° C, which sheets are used for the ball indentation hardness test according to VDE 0302 (load time 10 seconds).

The tensile stress at yield and at break is measured using molded traction rods (1/4 proportional rods) having a thickness of 1 mm according to DIN 53 455.

The stiffness in torsion is determined according to DIN 53 447 at a temperature of 20° and a load time of 60 seconds, using test rods made from plates having a thickness of 2 mm.

The sizes of the spherulites and the mechanical properties of shaped articles made from molding compositions of the invention are listed in Table 1. For a comparison, the corresponding data of linear polyoxymethylene which has not been nucleated are given.

Table 1

| Ex. | Terpolymer (% by wt.) | Size of Spherulites (microns) | Ball indentation hardness (kp/cm$^2$) | Tensile stress at yield (kp/cm$^2$) | Tensile stress at break (kp/cm$^2$) | Stiffness in Torsion (kp/cm$^2$) |
|---|---|---|---|---|---|---|
| a | — | 350 | 1560 | 650 | 506 | 7600 |
| 1 | 0.08 | 32 | 1600 | 690 | 560 | 8180 |
| 2 | 0.06 | 38 | 1590 | 685 | 560 | 8160 |
| 3 | 0.04 | 40 | 1590 | 680 | 550 | 8000 |
| 4 | 0.02 | 45 | 1580 | 680 | 545 | 8030 |
| 5 | 0.01 | 55 | 1580 | 670 | 540 | 7950 |
| 6 | 0.005 | 65 | 1575 | 670 | 530 | 7950 |

EXAMPLES 7 to 11

A linear copolymer of 97% of trioxan and 3% of dioxolane having a density of 1.41 g.ml$^{-1}$, a RSV value of 0.72 dl.g$^{-1}$ and a crystallite melting point of 166° C is mixed and homogenized, in the form of a powder, with the stabilizers cited in Examples 1 to 6 in the same amounts as indicated there, and with 0.5% by weight each of the pulverulent terpolymers of trioxan, 2% of ethylene oxide and varying amounts of 1,4-butanediol-diglycidyl ether as indicated in Table 2. The melt indices $i_2$ of the terpolymers used and the size of spherulites of shaped articles manufactured from mixtures of linear and cross-linked polyoxymethylene are listed in Table 2.

Table 2

| | Terpolymer made from | | | | |
|---|---|---|---|---|---|
| Ex. | trioxan (% by wt.) | ethylene oxide (% by wt.) | butanediol diglycidyl ether (% by wt.) | Melt index (g/10 min) | Size of spherulites (microns) |
| b | — | — | — | — | 530 |
| 7 | 97.8 | 2 | 0.2 | 0.06 | 17 |
| 8 | 97.4 | 2 | 0.6 | 0.01 | 13 |
| 9 | 97.0 | 2 | 1.0 | 0 | 15 |
| 10 | 96.0 | 2 | 2.0 | 0 | 11 |
| 11 | 95.0 | 2 | 3.0 | 0 | 9 |

EXAMPLES 12 to 16

A pulverulent linear copolymer of 98% of trioxan and 2% of ethylene oxide having a density of 1.41 g.ml$^{-1}$, a RSV value of 0.71 dl.g$^{-1}$ and a crystallite melting point of 166° C is mixed and homogenized according to Examples 1 to 6 with the stabilizers and in the amounts thereof as indicated in these Examples, and with 1% each of the terpolymers of trioxan, ethylene oxide (EO) or dioxolane (DO) and a multifunctionally reacting compound listed in Table 3. As multifunctionally reacting compounds, dicyclopentadiene oxide (I), methylglycidyl formal (II), the formal of 1,2,6-hexanetriol and polyglycol of molecular weight 1000 (III), 1,2,6-hexanetriol formal (IV) and the formal of 1,2,6-hexanetriol and 1,6-hexanediol (V) are employed. The melt indices $i_2$ of the cross-linked terpolymers and the sizes of the spherulites of shaped articles obtained from the molding compositions of the invention, furthermore the ball indentation hardness and the tensile stress at yield are indicated in Table 3.

Table 3

| | Terpolymer made from | | | | | Ball indentation hardness Tensile stress at yield (kp/cm$^2$) |
|---|---|---|---|---|---|---|
| Ex. | trioxan (% by wt.) | EO or DO (% by wt.) | multifunctional compound (% by wt.) | melt index | Size of spherulites (microns) | |
| c | — | — | — | | 387 | 1545 620 |
| 12 | 97.9 | 2AO | 0.1 I | 0 | 9 | 1675 660 |
| 13 | 97.9 | 2AO | 0.1 II | 0.08 | 21 | 1585 640 |
| 14 | 95.0 | 2DO | 3.0 III | 0.05 | 19 | 1615 645 |
| 15 | 97.9 | 2DO | 0.1 IV | 0 | 16 | 1615 645 |
| 16 | 97.0 | 2DO | 1.0 V | 0 | 8 | 1660 660 |

EXAMPLES 17 to 26

A linear copolymer of 98% of trioxan and 2% of ethylene oxide having a density of 1.41 g.ml$^{-1}$; a crystallite melting point of 166° C and a RSV value of 0.73 dl.g$^{-1}$ is mixed with the stabilizers indicated in Examples 1 to 6 in the amounts also indicated there, and with varying amounts of the finely ground cross-linked polyoxymethylenes (POM I to VIII) as hereinafter described, and extruded in a single screw extruder, at a temperature of the cylinder of 190° C, a temperature at the top of 180° C, and at a screw rotation of 60 r.p.m., and subsequently granulated. The residence time in the cylinder of the extruder is 4 minutes.

Table 4 shows the mixture ratios of linear and cross-linked polyoxymethylenes as well as the size of the spherulites and the ball indentation hardness of shaped articles made from the molding compositions of the invention.

POM I

To a mixture of 1000 g of trioxan, 20 g of ethylene oxide and 30 g of p-glycidoxy-cinnamic acid methyl ester, 35 ml of a catalyst solution of 1 part by volume of BF$_3$-dibutyl-etherate in 40 parts by volume of cyclohexane are added. The mixture, in a layer thickness of 0.8 cm, is polymerized in a closed vessel in a thermoconstant bath having a temperature of 70° C. The polymerization time is 30 minutes. The polymer block obtained is ground and treated for 30 minutes at 150° C in benzyl alcohol containing 1 % of triethanolamine, in order to remove the unstable terminal semi-acetal groups and the residual monomers. After cooling, the polymer is suction-filtered, boiled several times with methanol and dried at a temperature of from 50° to 70° C under reduced pressure. The polymer yield is 670 g, the RSV value of the polymer is 0.78 dl.g$^{-1}$, and its $i_2$ value is 1.27 g/10 min.

Subsequently, the polymer so obtained is ground and subjected to radiation of a Xenon test lamp for 10 hours. After this treatment, the RSV value cannot be measured any more, since only a small portion of the polymer is still soluble in butyrolactone. The melt index $i_2$ is 0.77 g/10 min.

POM II 1.5 ml of a catalyst solution of 1 part by volume of $BF_3$-dibutyl-etherate in 10 parts by volume of cyclohexane are added to a mixture of 85 g of trioxan, 5 g of dioxolane and 10 g of p-glycidoxy-benzaldehyde. The mixture is polymerized in a closed vessel in a thermoconstant bath of 70° C. The polymer block obtained is maintained at 70° C for a further 60 minutes, subsequently worked up in benzyl alcohol, and washed and dried as indicated for POM I. 79 g of a white powder are obtained the RSV value of which is 0.34 dl.g$^{-1}$.

The polymer is kneaded for 10 minutes with 0.5 % of bis(2-hydroxy-3-tert.-butyl-5-methylphenyl)methane and 0.1 % of dicyanodiamide at 195° C in a Brabender plastograph. The product obtained is insoluble in butyrolactone, its $i_2$ value is 0.15 g/10 min.

POM III 10 g of a copolymer of 1000 g of trioxan, 20 g of ethylene oxide and 50 g of p-glycidoxy-benzaldehyde are treated at 120° C for 30 minutes in 350 ml of benzyl alcohol with 0.3 ml of a 80% hydrazine hydrate solution. The melt index $i_2$ of the polymer of 156 g/10 min. is thus altered to 1.0 g/10 min.

POM IV 40 mg of adipic acid bishydrazide are added to 5 g of a copolymer of 1000 g of trioxan, 20 g of ethylene oxide and 50 g of p-glycidoxy-benzaldehyde, and the copolymer is additionally stabilized with 35 mg of bis(2-hydroxy-3-tert.-butyl-5-methylphenyl)methane. After a melting time of 40 minutes at 190° C, the melt index $i_2$ cannot be measured any more, while it was 156 g/10min. before the reaction.

POM V 0.7 ml of a catalyst solution of 1 part by volume of $BF_3$-dibutyl-etherate in 40 parts by volume of cyclohexane is added to a mixture of 95 g of trioxan and 5 g of p-glycidoxy-nitrobenzene, and the mixture is polymerized and worked up as described for POM I, the only difference being a polymerization time of 60 minutes. The washed and dried polymer powder is dissolved, at 120°-130° C, in 2 l of benzyl alcohol to which 50 ml of a 80% aqueous hydrazine hydrate solution is added, and, after complete dissolution, a trace of Raney nickel. The reaction mixture is maintained at 120°-130° C for 30 minutes. After cooling, the polymer is suction-filtered, boiled with methanol and dried at 50° to 70° C under reduced pressure. The yield of amino group containing polymer is 77 g, its melt index is 15.7 g/10 min.

25 g of the polymer are melted at 190° C, as described for POM II, with 200 mg of 1,4-diaza-bicyclo[2.2.2]-octane. 300 mg of 4,4'-diisocyanato-diphenylmethane are added in small portions within 3 minutes, which causes the viscosity of the melt to increase to a considerable extent. After a further 3 minutes, the reaction is stopped. The RSV value cannot be determined any more on account of the high degree of cross-linking; the $i_2$ value is 0.5 g/10 min.

POM VI

A mixture of 9 parts of trioxan and 1 part of epichlorohydrin is polymerized, as described for POM I, using 0.05 part of a mixture of 20 parts by volume of cyclohexane and 1 part by volume of boron trifluoride-di-n-butyl-etherate. The polymer block obtained is ground, and the powder is boiled in methanol for 30 minutes. After suction-filtration and drying at 50° C under nitrogen, a polymer powder having a RSV value of 0.64 dl.g$^{-1}$ and a chlorine content of 4.1% is obtained.

1 part of this polymer is agitated for 2 hours in an autoclave at 155° C under a nitrogen blanket with 1 part of potassium hydroxide, 17 parts of water and 33 parts of methanol. The mass remaining after cooling is ground and boiled several times with methanol. After drying at 50° C in a nitrogen current, 0.6 part of a weakly yellowish powder are obtained, the IR spectrum of which clearly shows hydroxyl bands.

25 g of this hydroxyl group containing polymer are melted at 190° C in a Brabender plastograph under nitrogen, together with 125 mg of bis(2-hydroxy-3-tert.-butyl-5-methyl-phenyl)methane and 25 mg of dicyanodiamide. After 200 mg of 1,4-diaza-bicyclo [2.2.2]-octane are added, a total of 500 mg of 4,4'-diisocyanatodiphenylmethane are added in small portions. The melt viscosity of the mixture increases to a considerable extent in this operation. After a further 5 minutes, the whole is allowed to cool. The $i_2$ value of the product is 0.1 g/10 min; the viscosity cannot be measured, since the polymer is insoluble in butyrolactone.

POM VII 25 g of a polymer of 88 parts of trioxan, 2 parts of ethylene oxide and 10 parts of p-glycidoxy-benzaldehyde obtained as described for the preparation of POM II are melted with 125 mg of bis(2-hydroxy-3-tert.-butyl-5-methyl-phenyl)methane at 190° C under nitrogen in a Brabender plastograph. A total of 370 mg of ethylene diamine are added in small portions within 15 minutes. After this time has passed, the melt has solidified, the $i_2$ value of the polymer cannot be measured any more.

POM VIII 10 g of a pulverulent copolymer of 98% of trioxan and 2% of dioxolane having a melt index $i_2$ of 9.0 g/10 min. are elutriated in 100 ml of cyclohexane (dried over lithium-aluminum hydride and distilled), and 1.0 ml of 1,4-butanediol-diglycidyl ether and 0.15 ml of boron trifluoride-di-n-butyl-etherate are added with agitation. The mixture is maintained at 45° C under nitrogen for 40 minutes and, as described for POM I, worked up with benzyl alcohol, washed and dried. The $i_2$ value of the polymer cannot be measured any more.

Table 4

| Example | linear POM (% by weight) | branched or cross-linked POM (% by weight) | Size of spherulites (microns) | Ball indentation hardness (kp/cm$^2$) |
|---|---|---|---|---|
| d | 100 | — | 550 | 1545 |
| 17 | 99 | 1 POM I | 15 | 1635 |
| 18 | 99 | 1 POM II | 7 | 1615 |
| 19 | 97 | 3 POM II | 6 | 1645 |
| 20 | 99 | 1 POM III | 10 | 1610 |
| 21 | 99 | 1 POM IV | 12 | 1615 |
| 22 | 99 | 1 POM V | 25 | 1600 |
| 23 | 99 | 1 POM VI | 10 | 1615 |
| 24 | 99.95 | 0.05 POM VII | 30 | 1600 |
| 25 | 99 | 1 POM VII | 25 | 1605 |
| 26 | 97 | 3 POM VIII | 16 | 1610 |

Example 27

A linear homopolymer of formaldehyde with terminal acetate groups, having a density of 1.43 g.ml$^{-1}$, a RSV value of 0.70 dl.g$^{-1}$ and a crystallite melting point of 174° C is mixed with the stabilizers indicated in Examples 1 to 6 in the amounts also indicated there, and 2% of POM VI used in Example 21, and homogenized and granulated as described in Examples 17 to 26. The size of spherulites and the ball indentation hardness of shaped articles obtained from the molding composition of the invention, as compared with an unmodified homopolymer, are listed in Table 5.

Table 5

| Example | linear POM (% by weight) | branched or cross-linked POM (% by weight) | Size of spherulites (microns) | Ball indentation hardness (kp/cm$^2$) |
|---|---|---|---|---|
| e | 100 | — | 482 | 1740 |
| 27 | 98 | 2 POM IV | 27 | 1790 |

Examples 28 and 29

A linear copolymer of 98% of trioxan and 2% of ethylene oxide having a density of 1.41 g.ml$^{-1}$, a crystallite melting point of 166° C and a RSV value of 0.73 dl.g$^{-1}$ is mixed with the stabilizers indicated in Examples 1 to 6 in the amounts also indicated there, and with 1 % each of POM IX and POM X as hereinafter described, and homogenized and granulated as described in Examples 17 to 26. The size of spherulites of shaped articles obtained from the molding compositions of the invention are listed in Table 6.

POM IX 100 g of a mixture of 96.75 parts of trioxan, 2 parts of dioxolane and 1.25 parts of a polyether of tetrahydrofuran, ethylene oxide and 2.9-dioxa-dispiro[3.2.3.2]duodecane in a weight ratio of 50:50:0.05 are combined with a catalyst solution of 1 part by volume of boron trifluoride-dibutyl-etherate and 20 parts by volume of cyclohexane and polymerized at 70° C for 30 minutes.

The cited polyether is prepared by polymerization at 20° C in aluminum tubes of each 100 g of monomer mixture using 150 mg of triphenyl-methyl-hexafluorophosphate as catalyst. The polymerization time is 24 hours, work-up is carried out by steam distillation.

The polyoxymethylene obtained is cooled to 0° C and ground at once to obtain a fine powder. The powder, at a concentration of 50 g of polymer per 1000 ml of a solution of methanol:water:triethylamine in a ratio (parts by volume) of 66:34:0.1, is degraded for 30 minutes in an autoclave under nitrogen at a temperature of 150° C. Subsequently, it is thoroughly washed with acetone and dried at 70° C in a nitrogen current. The product obtained has a melt index of from 2.8 g/10 min.

POM X

The preparation is carried out as for POM IX, but as polyether a terpolymer of tetrahydrofuran, ethylene oxide and 1,4-butanediol-diglycidyl ether in a weight ratio of 50:50:0.5 is used. The block copolymer obtained has a melt index $i_2$ of 4.1 g/10 min.

Table 6

| Example | linear POM (% by weight) | branched or cross-linked POM (% by weight) | Size of spherulites (microns) |
|---|---|---|---|
| f | 100 | — | 493 |
| 28 | 99 | 1 POM IX | 20 |
| 29 | 99 | 1 POM X | 25 |

We claim:
1. A thermoplastic molding composition consisting essentially of a mixture of from 99.999 to 90 percent by weight of a linear polyoxymethylene and from 0.001 to 10 percent by weight of a branched or cross-linked copolymer of trioxane with monofunctionally reacting compound copolymerizable with trioxane through its functional group, and a preformed copolymer of a monofunctionally reacting cyclic ether having from 3 to 5 ring members and a bifunctionally reacting cyclic ether having two ether ring groups of 3 to 5 members.

2. In a process of preparing a thermoplastic molding composition based on a linear polyoxymethylene containing a nucleating agent by mixing and homogenizing the components the improvement comprising nucleating said linear polyoxymethylene with a copolymer of
   A. from 99.99 to 50% by weight of trioxane
   B. from 0.01 to 30% by weight of a copolymer of
      1. a mono-functionally reacting cyclic ether of the formula

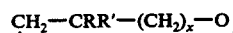

wherein R and R' are the same or different, each representing a hydrogen atom, an aliphatic alkyl radical having from 1 to 6 carbon atoms, which radical may contain from 1 to 3 halogen atoms, or a phenyl radical, and x is zero, 1 or 2, and
      2. a bifunctionally reacting cyclic ether selected from the group consisting of
         a. a diglycidyl ether of an α,ω-diol having from 2 to 8 carbon atoms,
         b. a diglycidyl ether of a bisphenol,
         c. an aliphatic or cyclo-aliphatic hydrocarbon doubly substituted by an oxacyclobutyl radical and having from 1 to 6 carbon atoms, and
         d. 2,9-dioxa-dispiro[3.2.3.2.]duodecane, and
   C. from 1 to 20% by weight of a mono-functionally reacting compound selected from the group consisting of
      1. a cyclic ether having from 3 to 5 ring members
      2. a cyclic acetal differing from trioxane and having from 5 to 11 ring members,
      3. a homopolymer of a cyclic formal of an aliphatic or cyclo-aliphatic α,ω-diol having from 2 to 8 carbon atoms, and
      4. a linear condensate of an aliphatic or cyclo-aliphatic α,ω-diol having from 2 to 8 carbon atoms with formaldehyde.

* * * * *